US006598435B2

(12) United States Patent
Cowan et al.

(10) Patent No.: US 6,598,435 B2
(45) Date of Patent: Jul. 29, 2003

(54) LOCKING DEVICE

(75) Inventors: Douglas L. Cowan, Snellville, GA (US); David S. Kerr, Mendham, NJ (US); Jason A. Kay, Robbinsville, NJ (US); Ronald Marchisin, Tobyhanna, PA (US); Ivan Pawlenko, Holland, PA (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/825,716

(22) Filed: Apr. 4, 2001

(65) Prior Publication Data

US 2002/0014098 A1 Feb. 7, 2002

Related U.S. Application Data

(63) Continuation-in-part of application No. 09/363,522, filed on Jul. 29, 1999, now abandoned.

(51) Int. Cl.[7] .......................... F16B 21/00; F16B 41/00

(52) U.S. Cl. ......................... 70/232; 411/549; 411/552; 411/910

(58) Field of Search ............................ 70/232; 411/349, 411/549, 552, 553, 910

(56) References Cited

U.S. PATENT DOCUMENTS

| | | | | | |
|---|---|---|---|---|---|
| 2,123,068 | A | * | 7/1938 | Summers | 411/552 |
| 2,356,162 | A | * | 8/1944 | Johnson et al. | 411/549 |
| 2,395,695 | A | * | 2/1946 | Summers | 411/552 |
| 2,763,908 | A | * | 2/1956 | Marschner | 411/552 X |
| 2,753,610 | A | * | 7/1956 | Miller | 411/549 |
| 3,152,822 | A | * | 10/1964 | Griffiths | 411/549 X |
| 3,460,210 | A | * | 8/1969 | Ellis | 411/552 |
| 3,675,280 | A | * | 7/1972 | Winslade | 411/552 |
| 3,966,340 | A | * | 6/1976 | Morris | 411/549 X |
| 4,827,609 | A | * | 5/1989 | Kawecki | 411/549 X |
| 5,275,029 | A | * | 1/1994 | Myers | 411/549 X |
| 5,361,925 | A | * | 11/1994 | Wecke et al. | 411/552 X |

FOREIGN PATENT DOCUMENTS

| | | | | |
|---|---|---|---|---|
| FR | 848353 | * | 10/1939 | 411/549 |
| FR | 941822 | * | 1/1949 | 411/552 |
| GB | 511155 | * | 8/1939 | 411/552 |
| GB | 1498827 | * | 1/1978 | 411/403 |
| IT | 321526 | * | 8/1935 | 411/552 |
| JP | 303306 | * | 12/1989 | 411/549 |

* cited by examiner

*Primary Examiner*—Lloyd A. Gall
(74) *Attorney, Agent, or Firm*—Thomas, Kayden, Horstemeyer & Risley, LLP

(57) ABSTRACT

A locking device suitable for NID housing security. The device includes a slotted cylinder, a key and key tool. The slotted cylinder has a resistance component contained in the cylinder. The key is mateable with the slotted cylinder and is held in place by the force of the resistance component. The key head has a cavity therein of a complimentary shape to the key tool so that the tool may be used to turn the key for locking or unlocking. A cylindrical sleeve is used for additional security. The sleeve fits over the mated key and slotted cylinder to protect against release of the parts and may further provide a barrier to removal from a structure being locked. By use of different key head cavity shapes each subscriber may only access their own line in a NID.

13 Claims, 4 Drawing Sheets

LOCKING DEVICE

CROSS REFERENCE TO PRIOR APPLICATIONS

This application is a continuation-in-part of U.S. Ser. No. 09/363,522 filed Jul. 29, 1999, now abandoned.

FIELD OF THE INVENTION

The invention relates to locking devices, and more particularly to locking devices for use with network interface devices (NIDs).

BACKGROUND OF THE INVENTION

Network interface devices (NIDs) or Network Interface Units (NIUs) house telephone line junctions and terminals. As used herein, the terms NID and NIU are interchangeable. The NID may provide either residential or commercial line access to one or more subscribers. The NID is typically placed between the subscriber's wiring and the service provider's subscriber loop.

Typically, the NID is sectioned for separate subscriber and service provider access. Each subscriber line terminal is typically covered by a hinged plate. Subscribers or service providers can usually access their individual lines in the compartment by lifting the plate, thereby exposing the subscriber line terminal. In many configurations, the compartment for a loop junction is limited to service provider access.

In most NID configurations, the individual subscriber line access cover plate is designed to be readily accessed. The line access covers are typically one inch wide and two inches in length, although there are known variations to these designs. Many configurations of these covers comprise a slot through which an apertured flange fixed to the NID housing may pass. A subscriber may place a small padlock through the aperture in the flange to prevent the cover from being lifted.

Unfortunately, present NID designs which enable easy access by subscribers and service providers, also permit access by unauthorized persons. The relatively small sized padlocks used for this application are known to have poor tamper-resistant characteristics. Additionally, due to the size of the cover, small padlocks must be used which are often difficult to use given dexterity limitations of individuals and/or the environmental conditions (i.e. poor lighting) at the NID. Even expensive small locks having improved tamper-resistant features also present similar problems. Additional problems result when a subscriber breaks a key in the lock or is unable to use the key provided with the lock due to the poor quality of the lock and key assembly. Further, larger locks, such as those having a combination or traditionally-sized keys, are typically not an option due to the size and physical limitations of the NID enclosure.

Consequently, line access in NIDs remains relatively poorly secured thereby exposing the subscriber to potential costs related to repair, theft and damage, particularly for NIDs accommodating numerous subscriber junctions.

Accordingly, there exists a need to economically and simply secure line access in NID configurations, and the like. There exists a need to provide a tamper-resistant solution that may be used in a relatively small area. There further exists a need for a device which is easily secured and removed by an authorized user of an existing NID cover configuration without affecting the operation of neighboring subscriber covers and/or accesses. Additionally, there exists a need to provide a device that locks a subscriber's line access cover uniquely from other accesses on the same NID, thereby preventing one subscriber from accessing another's line on the same NID.

SUMMARY OF THE INVENTION

Embodiments of the invention provide a locking device that may be used to prevent a subscriber from accessing another subscriber's line on the same NID.

The locking device includes a slotted cylinder having a first end, a second end and a first slot. The first slot has a distal end and a proximate end. The slot's proximate end coincides with the cylinder's first end and extends from the first cylinder end longitudinally and partially toward the second cylinder end. The cylinder has a second slot extending from, and opened to, the first slot distal end at an angle to the first slot. The cylinder has a resistance component contained in the cylinder at its second end. A key, mateable with the slotted cylinder, has a shaft with a key head at the first end of the shaft. A flange extends from and at an angle to a second end of the shaft. The key head has a cavity therein. The device also includes a key tool which is mateable with the key head cavity. The key may be inserted into the slotted cylinder and turned to lock it therein. The key tool is used to release the key from the slotted cylinder.

A cylindrical sleeve may be utilized for additional security. The sleeve has a first end, second end, first inner diameter, second inner diameter, and a third inner diameter. The first inner diameter is larger than the outer diameter of the slotted cylinder so that the slotted cylinder may fit in the sleeve. The first inner diameter extends from the first sleeve and to a length corresponding at least to the length of the slotted portion and the slotted cylinder. The sleeve's second diameter is larger than the key head so that the key head may fit at least partially within the sleeve. The second inner diameter extends from the second sleeve end to a length of at least about the key head length. The third inner diameter is positioned between the first inner diameter and the second inner diameter. The third inner diameter is larger than the key shaft diameter and smaller than the key head so that the sleeve cannot pass over the key head. A slot extending the length of the third inner diameter section and partially into the cylinder wall accommodates the key flange when the key is placed in the sleeve.

By use of different key head cavity shapes each subscriber may only access their own line in a NID.

DESCRIPTION OF THE DRAWINGS

The invention is best understood from the following detailed description when read with the accompanying drawings.

DETAILED DESCRIPTION OF THE INVENTION

Embodiments of the invention provide a locking device that may be used in conjunction with NIDs and may be manufactured using relatively inexpensive materials.

Figure 1A:
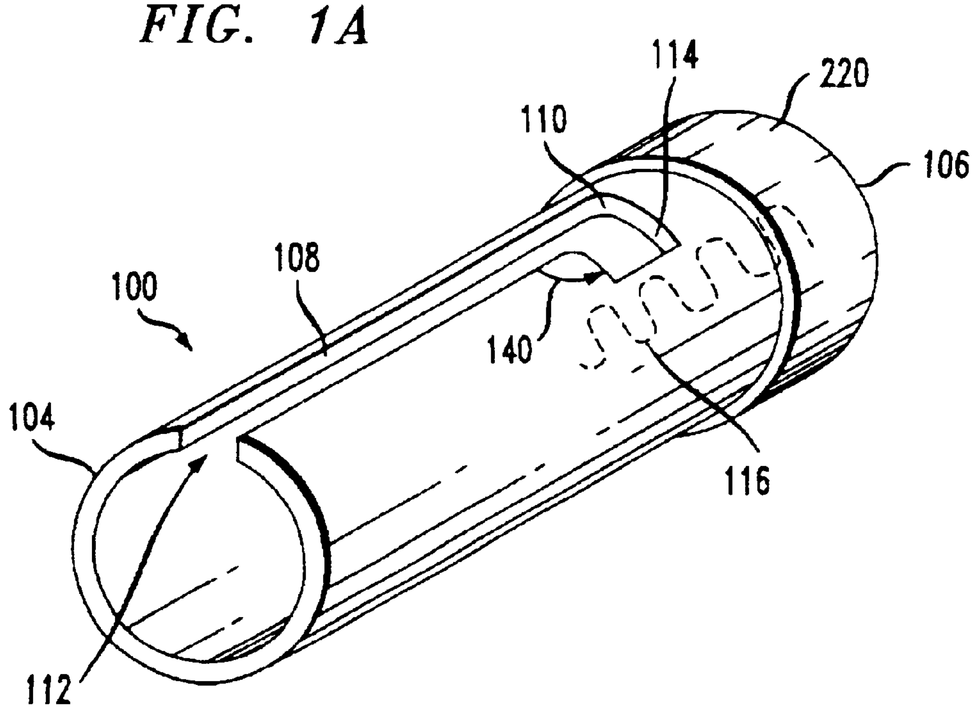
FIG. 1A depicts a slotted cylinder according to an illustrative embodiment of the invention.
Figure 1B:
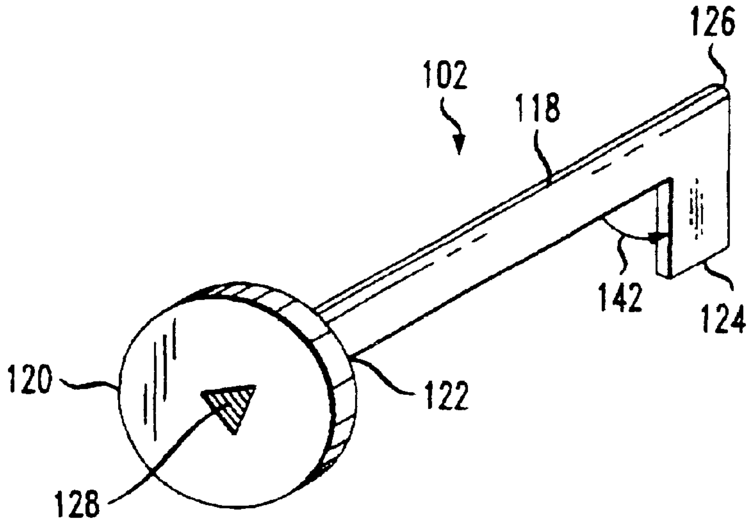
FIG. 1B depicts a key according to an illustrative embodiment of the invention.
Figure 1C:
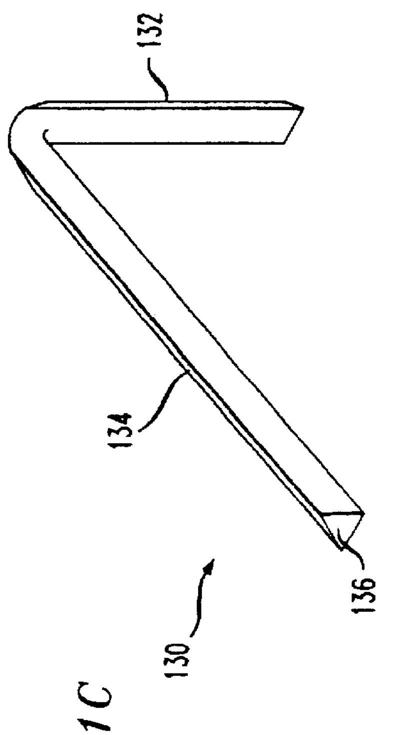
FIG. 1C depicts a key tool according to an illustrative embodiment of the invention.

FIGS. 1A–C depict an embodiment of the invention comprising a slotted cylinder 100 and a key 102. FIG. 1A depicts a slotted cylinder 100. The slotted cylinder 100 has a first end 104, a second end 106 and a first slot 108. The first slot 108 has a distal end 110 and a proximate end 112. The slot's proximate end 112 coincides with the cylinder's first end 104. The slot 108 extends from the first cylinder end 104 longitudinally and partially toward the second cylinder end 106. The cylinder 100 has a second slot 114 extending from the first slot distal end 110 at an angle 140 to the first slot 108. The second slot 114 may be straight or arced. The cylinder 100 may be provided with a resistance component 116 which is contained in the cylinder 100 at its second end 106. Preferably the resistance component 116 is affixed to the inside of the slotted cylinder second end 106.

FIG. 1B depicts the key 102. The key 102 has a shaft 118 with a head 120 at a first end 122 of the shaft 118, and a flange 124 extending from, and at an angle 142 to, a second end 126 of the shaft 118. The key head 120 has a cavity 128 operably mateable with a key tool 130. For example, the cavity may have a star or plus shape, into which a complementaly-shaped tool may be inserted. Additional examples of cavity shapes include triangle, square, "H", pentagon, and "T".

The key tool 130 may have any overall shape that enables a user to grasp and rotate it when engaged with the key. FIG. 1C depicts an illustrative embodiment of the key tool 130 with a key tool head 136 complementary in shape to the cavity 128 shown in FIG. 1B. They key tool 130 has a handle 132 used to turn the tool. A screwdriver-type handle in line with the key tool shaft 134 is a further example of a functional design.

The key flange end is inserted into the first slot 108 of the cylinder at the cylinder's proximate end 112 until it contacts the resistance component 116. The key 102 is then moved an additional amount toward the slot distal end 110 until it encounters and compresses the resistance component 116. Once compressed the resistance component 116 provides a force on the key 102 in a direction longitudinally along the key shaft 118 toward the slot proximate end 112.

The key tool 130 is then inserted into the key head cavity 128. Using the key tool 130, the key 102 is rotated around an axis defined by the length of the shaft 118 so that the key flange 124 moves into the second slot 114, thereby locking the key 102 into the slotted cylinder 100.

The resistance component 116 may be any structure that would provide sufficient pressure on the key 102 so that the key 102 is not free to slide out of the second slot 114. The resistance component 116 may be, for example, a metal coil such as a spring, rubber stop, elastomeric polymer, pliable plastic or other elastic material.

Figure 2A:
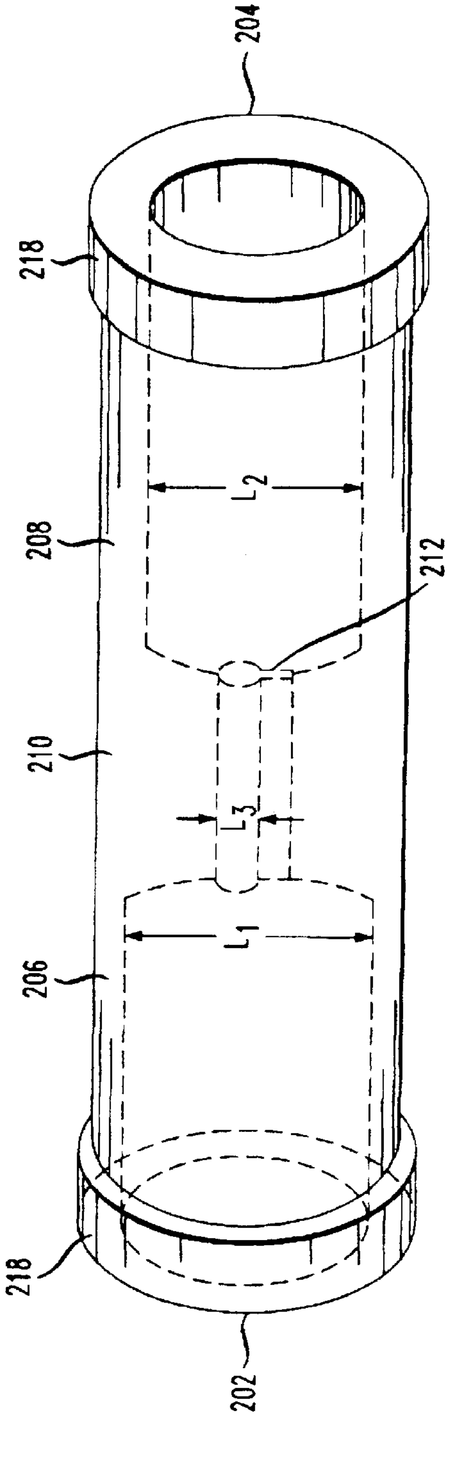
FIG. 2A depicts a sleeve according to an illustrative embodiment of the invention.
Figure 2B:
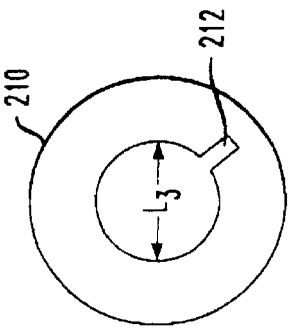
FIG. 2B depicts a cross-sectional view of a middle section of a sleeve according to an illustrative embodiment of the invention.
Figure 3:
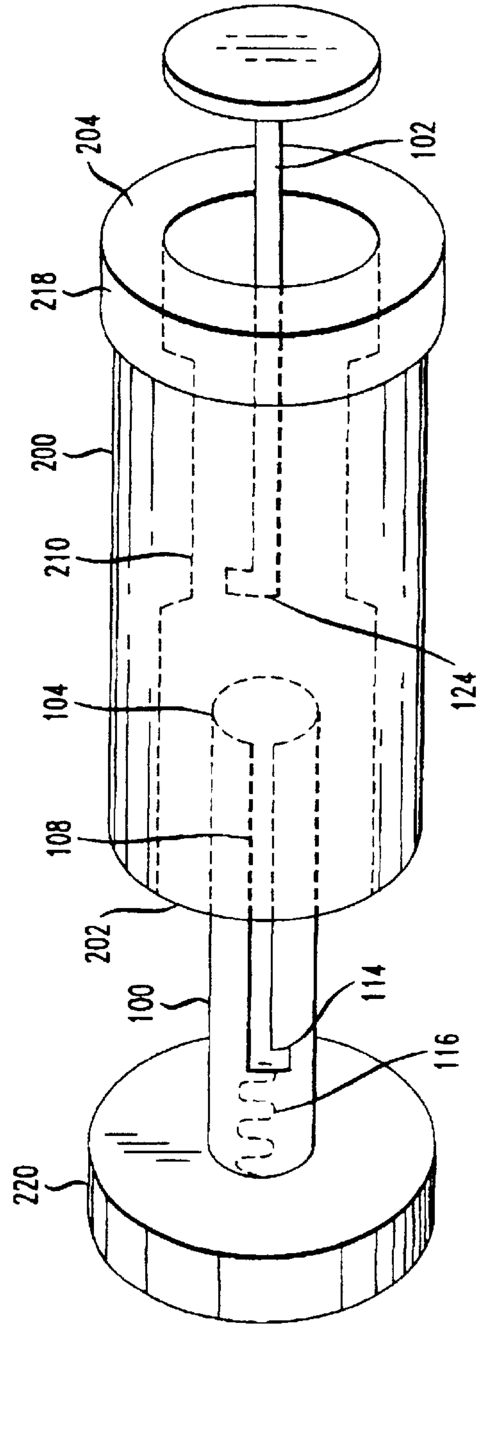
FIG. 3 depicts a slotted cylinder being engaged with a key in a sleeve according to an illustrative embodiment of the invention.

A further embodiment of the invention is depicted in FIGS. 2A–B and FIG. 3. This embodiment includes a cylindrical sleeve 200 which may provide additional security. FIG. 2A depicts an embodiment of the sleeve 200. The sleeve 200 has a first end 202 and a second end 204 and is divided into at least three sections 206, 208 and 210. The first section 206 has an inner diameter L1 which is larger than the outer diameter of the slotted cylinder 100 so that the slotted cylinder 100 may fit into the sleeve 200. The first section 206 extends from the first sleeve end 202 to a length corresponding at least to the length of the slotted portion of the slotted cylinder 100. The second sleeve section 208 may have a diameter L2 which is larger than the key head 120 so that the key head 120 may fit in the sleeve 200. Preferably the second section 208 extends from the second sleeve end 204 to a length sufficient to cover key 102 to the extent necessary to require the key tool 130 to disengage the key 102 from the slotted cylinder 100. The key tool 130 will generally be necessary for disengagement if the key head 120 is not protruding enough from the sleeve 200 to grasp it firmly enough to turn the key 102. The third sleeve section 210 is between the first and second sleeve sections 206, 208. The inner diameter L3 of the third section is larger than the key shaft diameter and smaller than the key head diameter. The third section 210 need only be as long as is necessary for the section to have the structural integrity necessary to provide the desired security. Too thin a third section 210 may weaken the device and not satisfactorily protect against tampering. As depicted in FIG. 2B, the third section 210 may have a slot 212 extending along the length of the section and cut partially into the cylinder wall to accommodate the key flange 124 when the key is positioned into the cylinder 100 through the sleeve 200. The slot 212 is only necessary if the length of the flange 124 is greater or equal to the radius of the key head 120 or if additional security is desired. The reason for this will become apparent when the operation of the sleeve is described below.

Operation of the sleeve 200 is depicted in FIG. 3. The key 102 is placed, flange end first, into the sleeve 200 at the sleeve second end 204. The slotted cylinder 100 is placed, first end 104 first, into the sleeve 200 at the sleeve first end 202. They key flange 124 is aligned with the slot 212 (not shown) in the sleeve wall of the third section 210, if such a slot exists, as it is put through the sleeve 200. The key flange 124 is also aligned with the first slot 108 in the slotted cylinder 100 as the key 102 enters the slotted cylinder 100. The key 102 is pushed into the sleeve 200 and the cylinder 100 until it meets the resistance component 116. At that point the key 102 is pushed farther until the key flange 124 reaches the second slot 114 and can be rotated so that the flange 124 is engaged with the second slot 114. This leaves the key 102 engaged with the slotted cylinder 100 with the sleeve 200 surrounding the engaged key and cylinder. In the embodiment depicted in FIG. 3, the diameter L3 of the third sleeve section 210 is smaller than the key head 120 or the slotted cylinder collar 220, or both so that the sleeve 200 cannot be slid over the engaged key and cylinder. The key 102 is locked into the slotted cylinder 100 and may have the sleeve 200 over the key head 120 so that the key 102 cannot be turned without the key tool 130.

Figure 4:
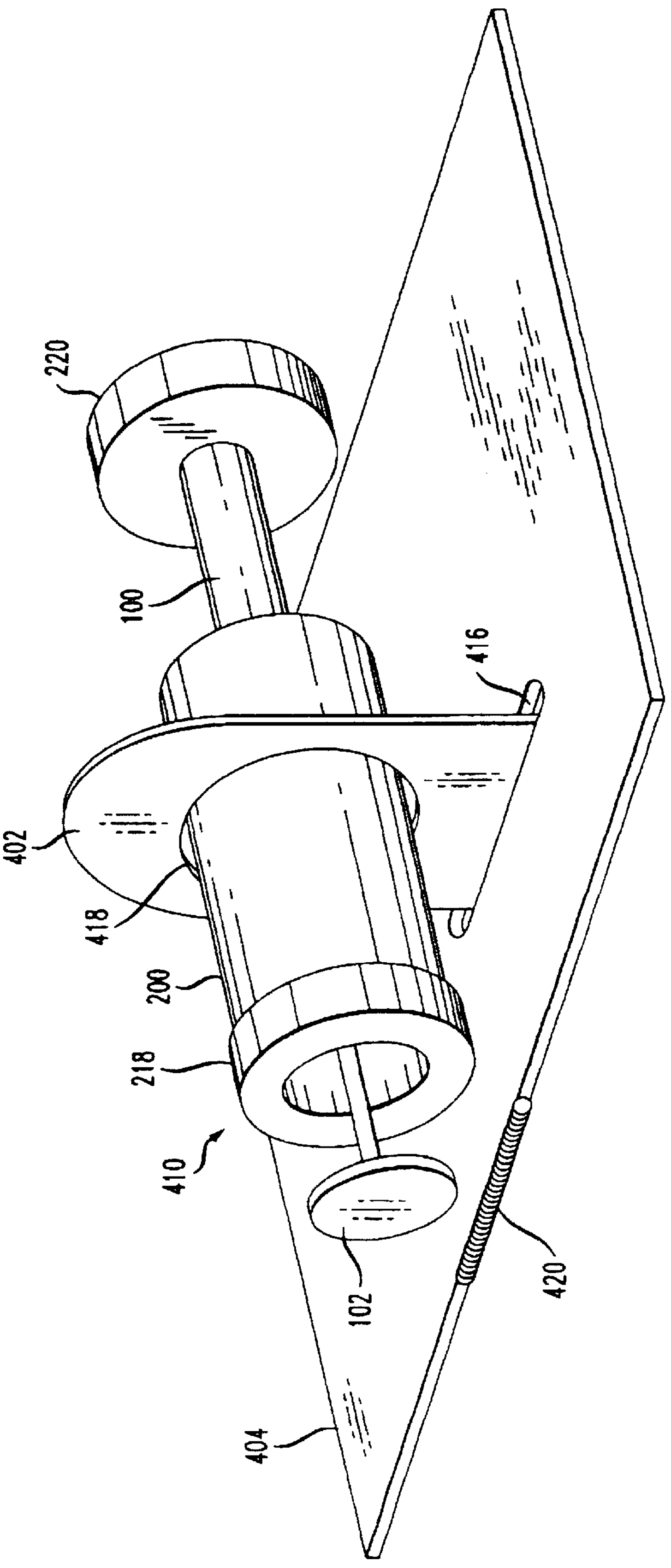
FIG. 4 depicts a slotted cylinder being engaged with a key in a sleeve in an aperture according to an illustrative embodiment of the invention.

FIG. 4 depicts the key 102 and the slotted cylinder 100 being slid into the sleeve 200. In a preferred embodiment, when the key 102 is engaged with the cylinder 100, the uncollared end of the sleeve 200 abuts the collar 220 of the slotted cylinder 100, and the outer face of the key head 102 is nearly flush with the outer face of the collar 218.

As depicted in FIG. 4, the sleeve-covered lock 410 is particularly useful in conjunction with a latch. Latch may comprise two apertured parts, a tab 402 and a lid 404, having apertures 418 and 416, respectively. The apertured tab 402 fits through the lid aperture 416 so that the tab aperture 418 may accommodate the sleeve-covered lock 410. When used with such a latch, the sleeve second end 204 and the slotted cylinder second end 106 may be fashioned with collars 218 and 220, respectively, so that the sleeve-covered lock 410 cannot be pulled through the tab aperture 418. A comparable configuration may be used on ND cover.

Although suitable for communication systems having NIDs, the locking device is also usable in other devices, such as lockers, utility boxes, tool boxes, protecting units, security systems and the like.

The sleeve 200 may have a collar 218 on at least one end. The sleeve collar 218 provides a barrier so that the sleeve-covered lock 410 cannot be slid through an aperture. As pictured in FIG. 3, the sleeve collar 218 is not necessary at the slotted cylinder end of the sleeve if a collar 220 exists on the slotted cylinder 100. In the embodiment depicted in FIG. 3, the slotted cylinder 100 fits into the sleeve 200 only as far as the collar 220. Therefore, when the sleeve 200 is over the engaged key 102 and slotted cylinder 100, there is a collar at each end of the sleeve-covered lock to keep the device from sliding through the aperture 418.

In a further illustrative embodiment, such as depicted in FIG. 2A, the sleeve 200 contains two collars 218 to keep the device from sliding through the aperture. In this embodiment, the slotted cylinder 100 can be placed entirely in the sleeve 200, providing additional security. The inner diameter L3 of sleeve section 210 will keep the engaged key and slotted cylinder from sliding out of the sleeve 200.

The sleeve 200 may function without any collar if, in addition to the slotted cylinder 100 having a collar 220, the key head 120 is larger than the sleeve second end 204 so that the sleeve 200 cannot slide over the key 102 when the key 102 is locked into the slotted cylinder 100. The key head 120 would have to be larger than the aperture 418 through which the sleeve-covered lock is placed. Preferably the key head 120 is very thin so it could not be easily grasped and turned without a key tool 130. A thicker key head 120 could be used in this fashion if for example, it was convex.

Advantageously, one or more parts of the locking device may comprise plastic or other economical material. The locking device, however, may be made of any material that can be formed into the desired parts and that exhibits the structural integrity necessary to provide the desired security. A further illustrative example of a locking device material is metal.

While the invention has been described by illustrative embodiments, additional advantages and modifications will occur to those skilled in the art. Therefore, the invention in its broader aspects is not limited to specific details shown and described herein. Modifications, for example, to the shapes of the key, key tool, slotted cylinder and sleeve, and to the materials used to fabricate the device, may be made without departing from the spirit and scope of the invention. Accordingly, it is intended that the invention not be limited to the specific illustrative embodiments but be interpreted within the full spirit and scope of the appended claims and their equivalents.

What is claimed is:

1. A locking device comprising:

a slotted cylinder having a first end, a second end and a first slot, the first slot having a distal end and a proximate end, the first slot's proximate end coinciding with the cylinder's first end, the first slot extending from the first cylinder end longitudinally and partially toward the second cylinder end, the cylinder having a second slot extending from and open to the first slot distal end at an angle to the first slot, the cylinder having a resistance component contained in the cylinder at its second end;

a key having a shaft, a head at a first end of the shaft, and a flange extending from and at an angle to a second end of the shaft, the key head having a cavity wherein the key locks into the cylinder by inserting it into the cylinder with the flange aligned with the first slot, moving the key toward the distal end of the first slot until it encounters and compresses the resistance component and is aligned with the second slot, and rotating the key so that the flange enters the second slot;

a cylindrical sleeve, the sleeve having a first end, second end, first inner diameter, second inner diameter, and third inner diameter, the first inner diameter being larger than the outer diameter of the slotted cylinder so that the slotted cylinder may fit in the sleeve, the first inner diameter extending from the first sleeve end to a length corresponding at least to the length of the slotted portion of the slotted cylinder, the sleeve second diameter being larger than the key head so that the key head may fit at least partially within the sleeve, the second inner diameter extending from the second sleeve end to a length of at least about the key head length, the third inner diameter positioned between the first inner diameter and the second inner diameter, the third inner diameter larger than the key shaft diameter and smaller than the key head so that the sleeve cannot be passed over the key head, a slot extending the length of the third inner diameter section partially into the sleeve wall to accommodate the key flange when the key is placed in the sleeve; and a key tool mateable with the key head cavity to rotate the key for locking and unlocking.

2. The locking device of claim 1 wherein the sleeve further comprises a collar at one or more ends.

3. The locking device of claim 1 wherein the slotted cylinder has a collar at the slotted cylinder second end.

4. The locking device of claim 1 wherein one or more parts of the locking device comprise plastic.

5. The locking device of claim 1 wherein the resistance component comprises a material selected from the group consisting of pliable plastic, elastomeric polymer, rubber and coiled metal.

6. The locking device of claim 1 wherein the second slot of the slotted cylinder is arc shaped.

7. The locking device of claim 1 wherein the key head cavity has a shape selected from the group consisting of a triangle, square, "H", pentagon, "T", cross and plus.

8. A locking device comprising:

a slotted cylinder having a first end, a second end and a first slot, the first slot having a distal end and a proximate end, the first slot's proximate end coinciding with the cylinder's first end, the first slot extending from the first cylinder end longitudinally and partially toward the second cylinder end, the cylinder having a second slot extending from and open to the first slot distal end at an angle to the first slot, the cylinder having a resistance component contained in the cylinder at its second end, the slotted cylinder having a collar at the slotted cylinder second end;

a key having a shaft, a head at a first end of the shaft, and a flange extending from and at an angle to a second end of the shaft, wherein the key locks into the cylinder by inserting it into the cylinder with the flange aligned with the first slot, moving the key toward the distal end of the first slot until it encounters and compresses the resistance component and is aligned with the second slot, and rotating the key so that the flange enters the second slot; and a cylindrical sleeve, the sleeve having a first end, second end, first inner diameter, second inner diameter, and third inner diameter, the first inner diameter being larger than the outer diameter of the slotted cylinder so that the slotted cylinder may fit in the sleeve, the first inner diameter extending from the first sleeve end to a length corresponding at least to the length of the slotted portion of the slotted cylinder, the sleeve second diameter being larger than the key head so that the key head may fit at least partially within the sleeve, the second inner diameter extending from the second sleeve end to a length of at least about the key head length, the third inner diameter positioned between the first inner diameter and the second inner diameter, the third inner diameter larger than the key shaft diameter and smaller than the key head so that the sleeve cannot be passed over the key head, a slot extending the length of the third inner diameter section partially into the sleeve wall to accommodate the key flange when the key is placed in the sleeve.

9. The locking device of claim 8 wherein the sleeve further comprises a collar at one or more ends.

10. The locking device of claim 8 wherein one or more parts of the locking device comprise plastic.

11. The locking device of claim 8 wherein the resistance component comprises a material selected from the group consisting of pliable plastic, elastomeric polymer, rubber and coiled metal.

12. The locking device of claim 8 wherein the second slot of the slotted cylinder is arc shaped.

13. The locking device of claim 8 wherein the key head further comprises a key head cavity having a shape selected from the group consisting of a triangle, square, “H”, pentagon, “T”, cross and plus.

* * * * *